United States Patent

Sakuragi

[11] Patent Number: 5,204,959
[45] Date of Patent: Apr. 20, 1993

[54] SYSTEM FOR DETERMINING IMAGE SIZE RATIO OF DATA FOR PRESENTATION OF PROPER SIZE ON DISPLAYS OR PRINTERS FROM OPTICAL STORAGE

[75] Inventor: Hiroshi Sakuragi, Saitama, Japan

[73] Assignee: Kabushiki Kaisha Toshiba, Kanagawa, Japan

[21] Appl. No.: 370,002

[22] Filed: Jun. 22, 1989

[30] Foreign Application Priority Data

Jun. 30, 1988 [JP] Japan .................. 63-163819

[51] Int. Cl.[5] .................. G06F 15/20; H04N 1/04
[52] U.S. Cl. .................. 395/600; 395/102; 395/152; 364/DIG. 1; 364/235; 364/237.2
[58] Field of Search ... 364/200 MS File, 900 MS File; 382/44-47; 358/287, 342; 395/102, 152, 600

[56] References Cited

U.S. PATENT DOCUMENTS

| | | | |
|---|---|---|---|
| 4,468,755 | 8/1984 | Iida | 364/900 |
| 4,532,602 | 7/1985 | DuVall | 364/577 |
| 4,580,242 | 4/1986 | Suzuki et al. | 364/900 |
| 4,675,908 | 6/1987 | Saito et al. | 382/41 |
| 4,686,580 | 8/1987 | Kato et al. | 358/287 |
| 4,700,234 | 11/1987 | Nagashima | 358/260 |
| 4,791,680 | 12/1988 | Yokoe et al. | 382/56 |
| 4,809,083 | 2/1989 | Nagano et al. | 358/287 |
| 4,816,925 | 3/1989 | Hayashi | 358/342 |
| 4,878,250 | 10/1989 | Kotera et al. | 382/56 |
| 4,893,258 | 1/1990 | Sakuragi | 364/521 |
| 4,899,291 | 2/1990 | Tsukada | 364/518 |

Primary Examiner—Thomas C. Lee
Assistant Examiner—Larry Donaghue
Attorney, Agent, or Firm—Finnegan, Henderson Farabow, Garrett and Dunner

[57] ABSTRACT

An image information processing apparatus for retrieving image information from an optical memory. This apparatus has a buffer memory for storing the retrieved image information, a size converting (enlarge/reduction) circuit for converting the size of the image information stored in the buffer memory, and a printer for printing the image information converted by the converting means on a recording paper. Also, this apparatus includes a controlling unit for performing the size converting and printing operations as follows: (a) determine a first size converting ratio corresponding to the size of the retrieved image information and the recording paper; (b) ascertain whether or not the first size converting ratio is within a predetermined range; (c) set a second size converting ratio which is within the predetermined range when the first size converting ratio is outside the predetermined range; (d) supply the size converted image information to the printer when the converting circuit converts the size of the image information by the first converting ratio; and (e) supply the size converted image information to the buffer memory when the converting circuit converts the size of the image information by the second converting ratio.

7 Claims, 6 Drawing Sheets

Fig.1.

| TITLE | L | T·ADR | S.ADR | S |
|---|---|---|---|---|
| 20 | 1 | 2 | 1 | 1 |

SYSTEM FOR DETERMINING IMAGE SIZE RATIO OF DATA FOR PRESENTATION OF PROPER SIZE ON DISPLAYS OR PRINTERS FROM OPTICAL STORAGE

BACKGROUND OF THE INVENTION

The present invention relates to an image information processing apparatus which is adapted for retrieving image information by using an optical memory. More specifically, the invention relates to an image information processing apparatus which is capable of printing image information retrieved from the optical memory.

An image information processing apparatus, such as a document filing apparatus, is used for storing and retrieving image information of an original document to on and from an optical memory. In the document filing apparatus of the type described above, image information of documents is read by a two-dimensional scanner and such image information is stored in the optical memory. Also, the desired image information among the various image information stored in the optical memory is retrieved and read out to be reproduced visually by an output device, such as a CRT display or a printer.

In such image processing apparatus, for example, when the size of the image retrieved from the optical memory differs from the size of the image outputted from the CRT display or the printer, the retrieved image is enlarged or reduced using an enlarging/reducing ratio in accordance with the size of the outputted image. An image processing apparatus of this type is described in U.S. Pat. No. 4,468,755.

However, for example, when the size of the image retrieved from the optical memory differs greatly from the size of the recording paper outputted from the printer, for example, the size of the retrieved image is A2 size and the size of the recording paper is A4 size, the processing time for reducing the size of the retrieved image is too long. Therefore, in the conventional apparatus, the printer may not reproduce the hard copy of the retrieved image due to a timing error.

SUMMARY OF THE INVENTION

Accordingly, it is an object of the present invention to provide an improved image information processing apparatus which may output a large-sized image retrieved from an optical memory.

In accordance with the present invention, the foregoing object and others are achieved by providing an image information processing apparatus including first memory means for storing image information, means for retrieving the image information from the first memory means, second memory means for storing the image information retrieved by the retrieving means, means for converting a size of the image information stored in the second memory means, means for outputting the image information converted by the converting means, means for determining a first size converting ratio corresponding to the size of the retrieved image information and the outputted size of the image information and having means for ascertaining whether or not the size converting ratio is within a predetermined range and means for setting a second size converting ratio which is within the predetermined range, when the first size converting ratio is outside the predetermined range, and means for controlling the converting means and having first means for supplying the size-converted image information to the outputting means when the converting means converts the size of the image information by the first converting ratio and second means for supplying the size-converted image information to the second memory means when the converting means converts the size of the stored image information by the second converting ratio.

BRIEF DESCRIPTION OF THE DRAWINGS

A more complete appreciation of the present invention and many of its attendant advantages will be readily obtained by reference to the following detailed description considered in connection with the accompanying drawings, in which.

DETAILED DESCRIPTION OF THE PREFERRED EMBODIMENTS

Figure 1:
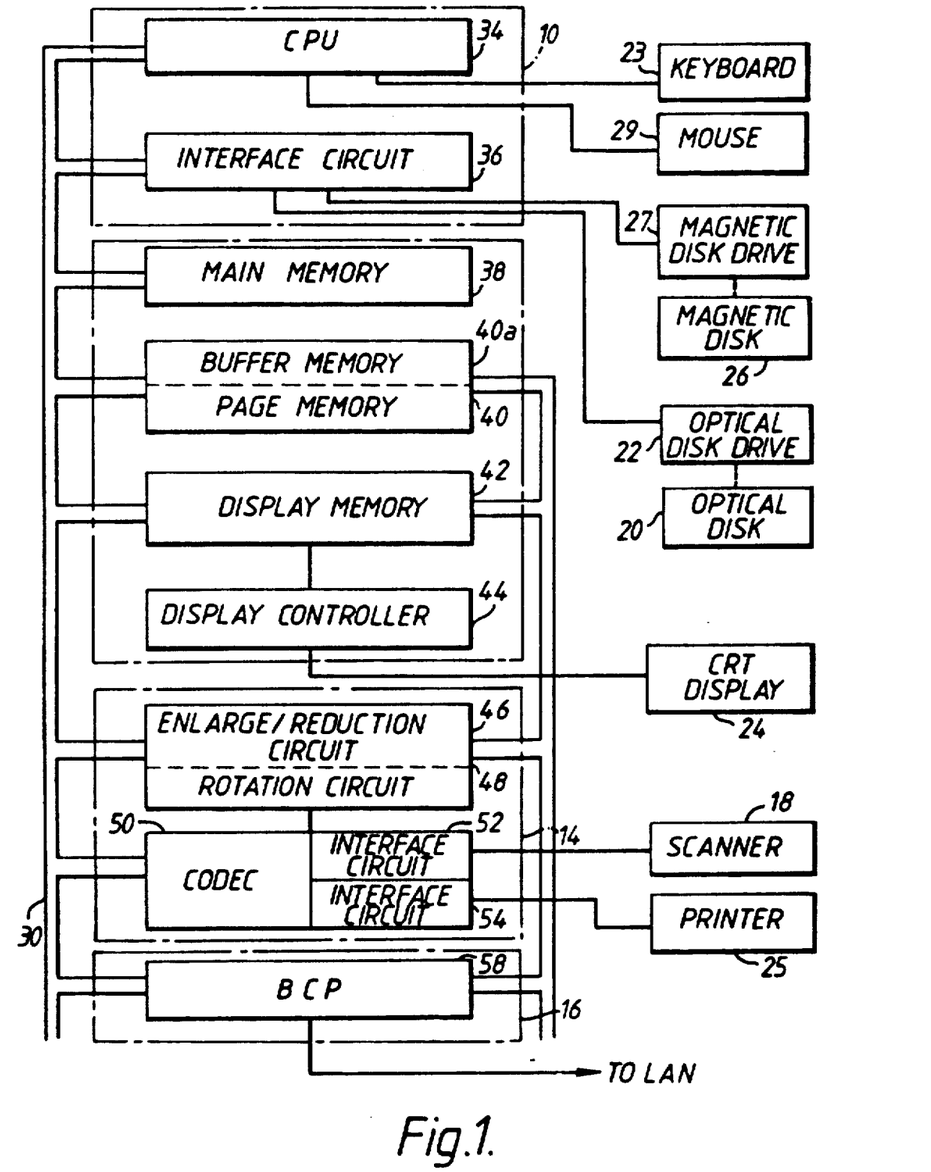
FIG. 1 is a schematic block diagram of an image information processing apparatus applied to a document filing apparatus with an optical memory according to the present invention.

Referring now to FIG. 1, there is shown an image information processing apparatus applied to a document filing apparatus having an optical memory according to the present invention. The image information processing apparatus has a control module 10, a memory module 12, an image processing module 14, a communication control module 16, a two-dimensinal scanner 18, an optical memory (an optical disk) 20, and an optical disk drive 22, a keyboard 23, a CRT display 24, a printer 25, a magnetic disk 26, and a magnetic disk drive 27, a pointing device (mouse) 29, a system bus 30 and an image bus 32.

Control module 10 includes a CPU 34 which may perform various control operations for storing and retrieving image information, and an interface circuit 36 coupled to optical disk drive 22 and magnetic disk drive 26. Also, CPU 34 is connected to keyboard 23 and mouse 29.

Memory module 12 includes a main memory 38, a page memory 40, a display memory 42 and a display controller 44. Main memory 38 stores various programs for executing image storing and retrieving operation, management information, etc. Page memory 40 has a memory area corresponding to at least one unit of image information, i.e., one page of image information on an A1 size original document, and a buffer memory area 40a, and temporarily stores the image information read by scanner 18 or retrieved from optical disk 20 therein. Display memory 42 stores the image information for displaying on CRT display 24 through page memory 40.

Image processing module 14 includes a size conversion circuit (an enlarge/reduction circuit) 46, a rotation circuit 48, a compression/expansion circuit (CODEC) 50, a scanner interface circuit 52 and a printer interface circuit 54.

Enlarge/reduction circuit 46 performs an expansion operation, a reduction operation and a strike-through operation in which an (enlarge/reduction ratio=0%) in response to a control signal from CPU 34 through system bus 30. Thus, enlarge/reduction circuit 46 is provided with predetermined size conversion ratio data from CPU 34 and enlarges or reduces the image information to a predetermined size so as to adapt the image information for CRT display 24 or printer 25. Rotation circuit 48 performs a vertical-horizontal conversion of the image information. Compression/expansion circuit (CODEC) 50 performs a signal compressing and expanding operation based on the MH (Modified Hoffman) conversion or inverse conversion. Also, scanner 18 and printer 25 are coupled to compression/expansion circuit 50 via scanner interface 52 and printer interface 54, respectively.

Communication control module 16 includes a communication interface 58, such as a business communication processer (BCP), which serves as an interface for a local area network (LAN).

Also, CPU 34 of control module 10 is coupled to main memory 38, page memory 40, display memory 42, expansion/reduction circuit 46, rotation circuit 48, compression/expansion circuit 50 and communication interface 58 via system bus 30. Moreover, page memory 40 is coupled to display memory 42, expansion/reduction circuit 46, rotation circuit 48 and communication interface 58 via image bus 32.

Figure 2:
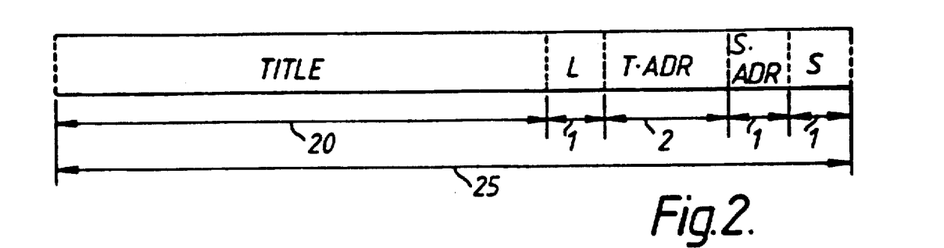
FIG. 2 is a view showing a format of retrieval data recorded in the magnetic disk.

Two-dimensional scanner 18 is coupled to CPU 34 through scanner interface 52 and system bus 30. Scanner 18 performs two-dimensional scanning of original documents ranging from an A5 to A1 size to obtain a video signal corresponding to image information on documents. Printer 25 is coupled to CPU 34 through printer interface 54 and system bus 30. Printer 25 reproduces a hard copy of image information obtained from scanner 18 or read out from optical disk drive 22 through page memory 40. Optical disk drive 22, a large capacity storage device, is coupled to CPU 34 through interface circuit 36 and system bus 30. Optical disk drive 22 sequentially stores image information obtained from scanner 18 in optical disk memory 20. Keyboard 23 and mouse 29 are connected to CPU 34. Keyboard 23 is used to enter various operating instructions and title information for individually identifying image information to be stored or retrieved. Also, mouse 29 is used to move a cursor displayed on the screen of CRT display 24. Magnetic disk drive 27 is coupled to CPU 34 through interface circuit 36 and system bus 30 and stores retrieval data corresponding to the document information in magnetic disk 26. Each of the retrieval data includes various index data. As shown in FIG. 2, each of the various index data includes a title code, which has twenty digits divided into a maximum of five items, and an address code of five digits. The address code has a 1-digit data length L (i.e., track No.), a 1-digit sector address S.ADR and a 1-digit document size S. The document size can be, for example, A4, B4, etc.

Figure 3:
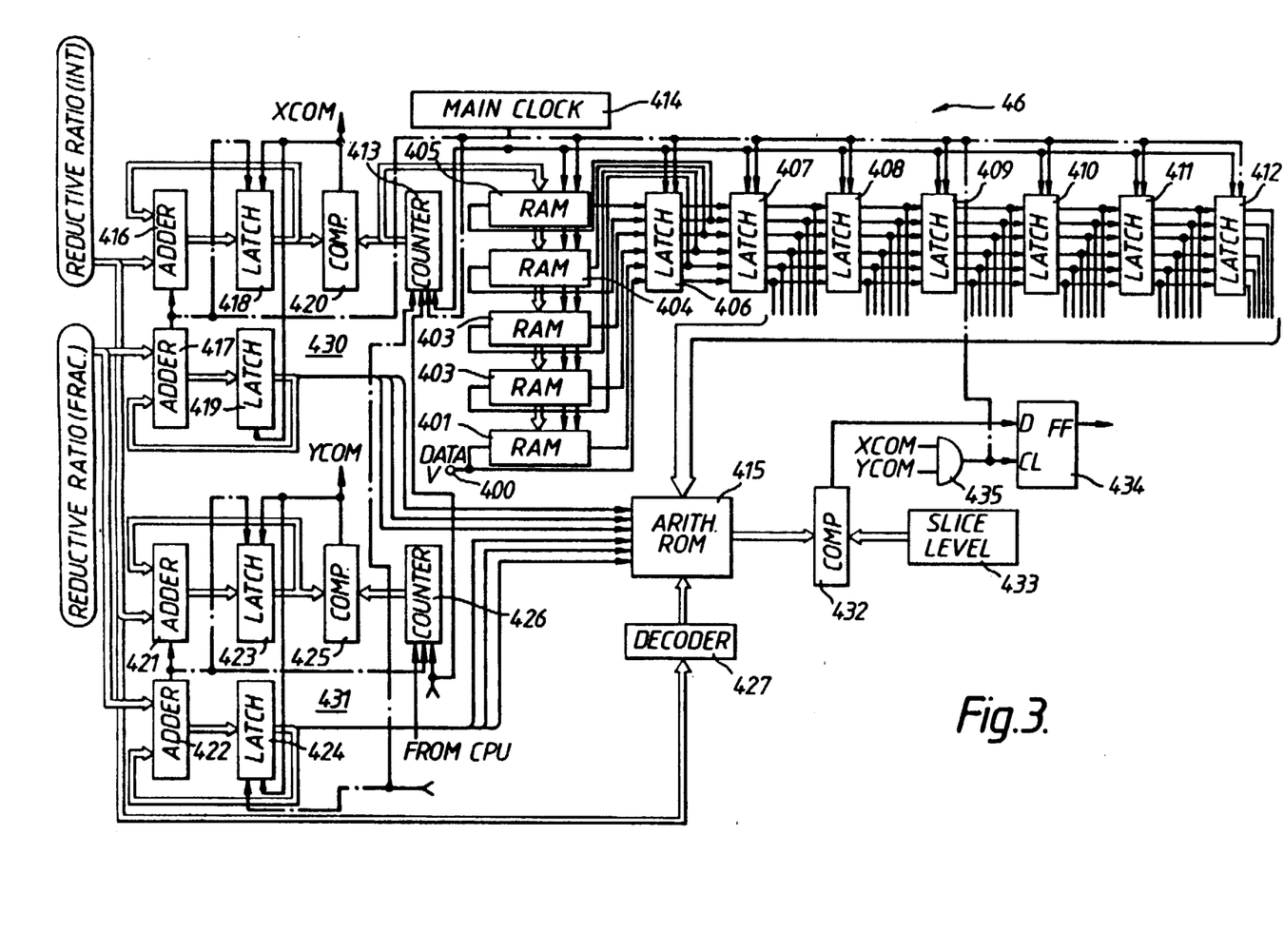
FIG. 3 is a block diagram of an enlarge/reduction circuit shown in FIG. 1.

FIG. 3 shows a detailed circuit construction of enlarge/reduction circuit 46. In enlarge/reduction circuit 46, for example, image information of one line read out of page memory 40 is supplied to a data input terminal 400.

The image information of one line is assumed to consist of 2,048 bits in this case. The image information supplied to terminal 400 is supplied to a RAM 401 and a latch 406 of six-bits. RAM 401 is a 2K×1 bit memory and the address thereof is designated by the output of a counter 413. In enlarge/reduction circuit 46, five RAMs 401 to 405 and seven latches 406 to 412 are provided. These RAMs 401 to 405 and latches 406 to 412 are all operated by a clock signal supplied from a main clock generator 414 through a signal path shown by a solid line or a signal line shown by a two-dot line. The signal path shown by the solid line is used when the circuit of FIG. 3 acts as an enlarge/reduction circuit and the signal path shown by the two-dot line is for a size expansion circuit.

Thus, under the address control of counter 413, a first one line image information of 2,048 bits is stored in first RAM 401. Then, when a first bit of a second line image information is supplied to RAM 401 the first bit of the first line image information stored in RAM 401 is read out therefrom and latched at latch 406, while the first bit of the second line is stored in the first memory location of RAM 401. Then, the second bit of the second line is stored in RAM 401 and the second bit of the first line is read out and latched in latch 406. At the same time, the first bit of the first line latched at latch 406 is sent to second RAM 402 and stored therein. In this way, when the last (2,048th) bit of the second line is stored in RAM 401, the first one line image information data of 2,048 bits is shifted to second RAM 402. Thus, each one line image information of 2,048 bits is sequentially shifted in RAMs 401 to 405. At last, first to fifth line image information is respectively stored in RAMs 405 to 401 and first bits of each first to fifth line image information are latched at latch 406 to be sent to latch 407 at the same time together with a first bit of sixth line image information supplied to terminal 400.

Figure 4:
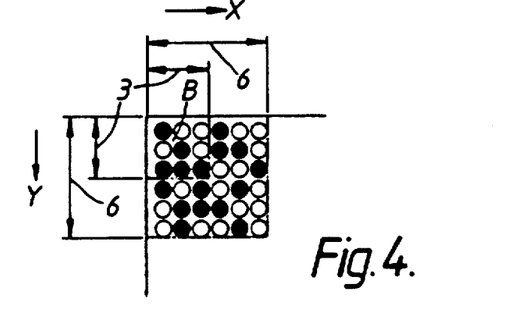
FIG. 4 is a schematic diagram useful in explaining the operation of the enlarge/reduction circuit shown in FIG. 3.

When a second bit of the sixth line is supplied to terminal 400, each first bit of the first to sixth lines latched at latch 407 is sent to next latch 408 and each second bit of the first to sixth lines is latched at latch 407. In a similar manner, when a seventh bit of the sixth line image information is supplied to terminal 400, the first bit of each first to sixth line is latched at latch 412, the second bit of the same is latched at latch 411, the third bit at latch 410, the fourth bit at latch 409, fifth the bit at latch 408, and the sixth bit at latch 407. Thus, if the respective bits latched in latches 407 to 412 are rearranged in a matrix array, the original image is reproduced as the dot image as shown in FIG. 4, wherein the black dots represent "1" bits and white dots represent "0" bits. Thus, a local image information of 6 bits (X direction) by 6 lines (Y direction) is supplied to an arithmetic ROM 415 from the latches 407 to 412.

Two adders 416 and 417, two latches 418 and 419, a comparator 420 and counter 413 form a distance calculating circuit 430 in the X direction, and two adders 421 and 422, two latches 423 and 424, a comparator 425 and a counter 426 constitute a distance calculating circuit 431 in the Y direction. These distance calculating circuits 430 and 431 are used for calculating an image dot position of a size-converted image in both the X and Y directions. The size conversion (expansion or reduction) rate setting data in the X, Y, directions supplied from CPU 34 is supplied to adders 416, 417, 421 and 422. In enlarge/reduction circuit 46, a reduction ratio data is shown as an example. The integer part of the reduction rate is supplied to adders 416, 421 and a decoder 427 and the fraction part is supplied to adders 417 and 422. The outputs of adders 416, 417, 421 and 422 are supplied to latches 418, 419, 423 and 424, respectively. The outputs of latches 418 and 423 are respectively supplied to one input of comparators 420 and 425 and are also fed back to the inputs of adders 416 and 421, respectively. The other inputs of comparators 420 and 425 have inputs supplied from counters 413 and 426, respectively. The outputs of latches 419 and 423 are fed back to the inputs of adders 417 and 421, respectively.

Three bits in the fraction part output data of circuit 430 and three bits in the fraction part output data of circuit 431 are output from respective latches 419 and 424 and are supplied to arithmetic ROM 415 as an address designating signal. The output data read out of arithmetic ROM 415 is supplied to one input of a comparator 432 which has an other input supplied with a slice level data obtained from a slice level data generator 433. The coincidence signal of comparator 432 is supplied to a D input terminal of a flip-flop 434 having a clock terminal CL supplied with an output of an AND gate 435. AND gate 435 has one input supplied with a coincidence output XCOM of comparator 420 and supplied with an input YCOM obtained from comparator 425.

The operation of enlarge/reduction circuit 46 shown in FIG. 3 will be described in detail by referring to FIG. 5. It is assumed that the reduction ratio designaed from the CPU 34 is 1/4.5. Thus, the integer part of the reduction ratio is 4 while the fraction part thereof is 0.5. This numeric data in digital form is set in each of adders 416, 417 and 421, 422.

Figure 5:
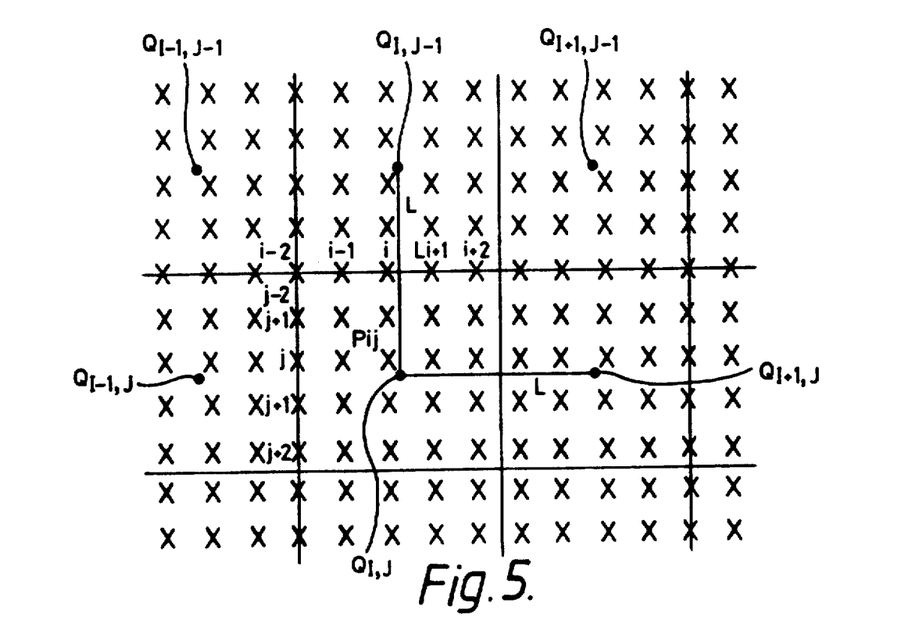
FIG. 5 is a schematic diagram useful in explaining the operation of the enlarge/reduction circuit shown in FIG. 3.

In FIG. 5, image dot positions of the original image are designated by the symbol "X" while the image dot positions of the size-converted image are designated by the black dot. The image dot at the position (i,j) on the original image is defined as (Pij).

$$(Pij) = \begin{cases} 1 \ldots \text{black dot} \\ 0 \ldots \text{white dot} \end{cases}$$

The image dot at the position (I,J) on the size-reduced image is defined as (Qij)

The distance between two adjacent image dots of the original image is defined as 1. Then the distance between two adjacent size-reduced dots on the original image equals with reduction ratio Rr.

L=Rr.

In this case a constant L is set to 4.5. When an LXL area, having a center position Qij, is designated as S, the average gray level Gij of S is calculated based upon whether the image dot (Pij) belonging to the area S exists or not. If the distance between the respective original position Pij and the converted position Pij is defined as rij, the weighting factor aij for calculating the average gray level Gij is determined so that the factor aij is inversely proportional to the distance rij. Thus, by setting the factor aij to 1 at the position of Qij, and as 0.5 at the position away from Qij by L/2, the factor aij is represented as follows.

$$Aij = 1 - (0.5/(L/2) \times rij) = 1 - (rij/L)$$

Therefore, the average gray level Gij $$Gij = \Sigma Aij \times Pij / \Sigma Aij (Pij - S)$$

is obtained. Then, the converted image dot $$(Qij) = \begin{cases} 1 \ldots Gij > 0 \\ 0 \ldots Gij < 0 \end{cases}$$

is obtained by using a predetermined slice level $\theta$.

Now the operation of enlarge/reduction circuit 46 of FIG. 3 will be described. The integer part 4 of the reductive ratio supplied from CPU 34 is supplied to latch 418 through adder 416. Thus, when the contents of counter 413 becomes 4, a coincidence signal XCOM is delivered from comparator 420 and is supplied to latches 418 and 419 and AND gate 435. On the other hand, the fractional part 0.5 is latched at latch 419 through adder 417. Thus, when the signal XCOM is supplied to latches 418 and 419, an addition of 0.5+0.5=1 is calculated at adder 417 and a carry signal of 1 is supplied to adder 416. Accordingly, an addition of 4+4+1=9 is done at adder 416 and a new data "9" is set at latch 418. In this time, when the contents of counter 413 becomes "9", an output XCOM is obtained at the output of comparator 420. Then 9+4=13 is set at latch 418 and an output XCOM is obtained when counter 413 reaches 13. At this time, an addition of 13+4+1 is done at adder 416 and a new data "18" is set at latch 418. Thus, each time the contents of counter 413 becomes "4, 9, 13, 18, 22, 27, . . . " an output XCOM is obtained at comparator 420. This output XCOM is supplied to one input of AND gate 435.

The same operation as in circuit 430 is performed in circuit 431 and an output YCOM is supplied to the other input of AND gate 435 from comparator 425 every time the contents of counter 426 reaches "4, 9, 13, 18, 22, 27, . . . ". When both the inputs XCOM and YCOM are supplied to AND gate 435, an output is supplied to the clock terminal of flip-flop 434. At this time, if the output level Gij or arithemetic ROM 415 concides with an output level of slice level generator 433, an output is supplied from comparator 432 to the D terminal of flip-flop 434, and an output Qij of a black dot as shown in FIG. 5 is obtained from flip-flop 434.

In the enlarging operation an, enlarging ratio of, for example, 0.5 is supplied to adders 416, 417, 421 and 422 from the CPU 34. In this case, the number Qij is twice the number Pij and the original image size is doubled.

Figure 6:
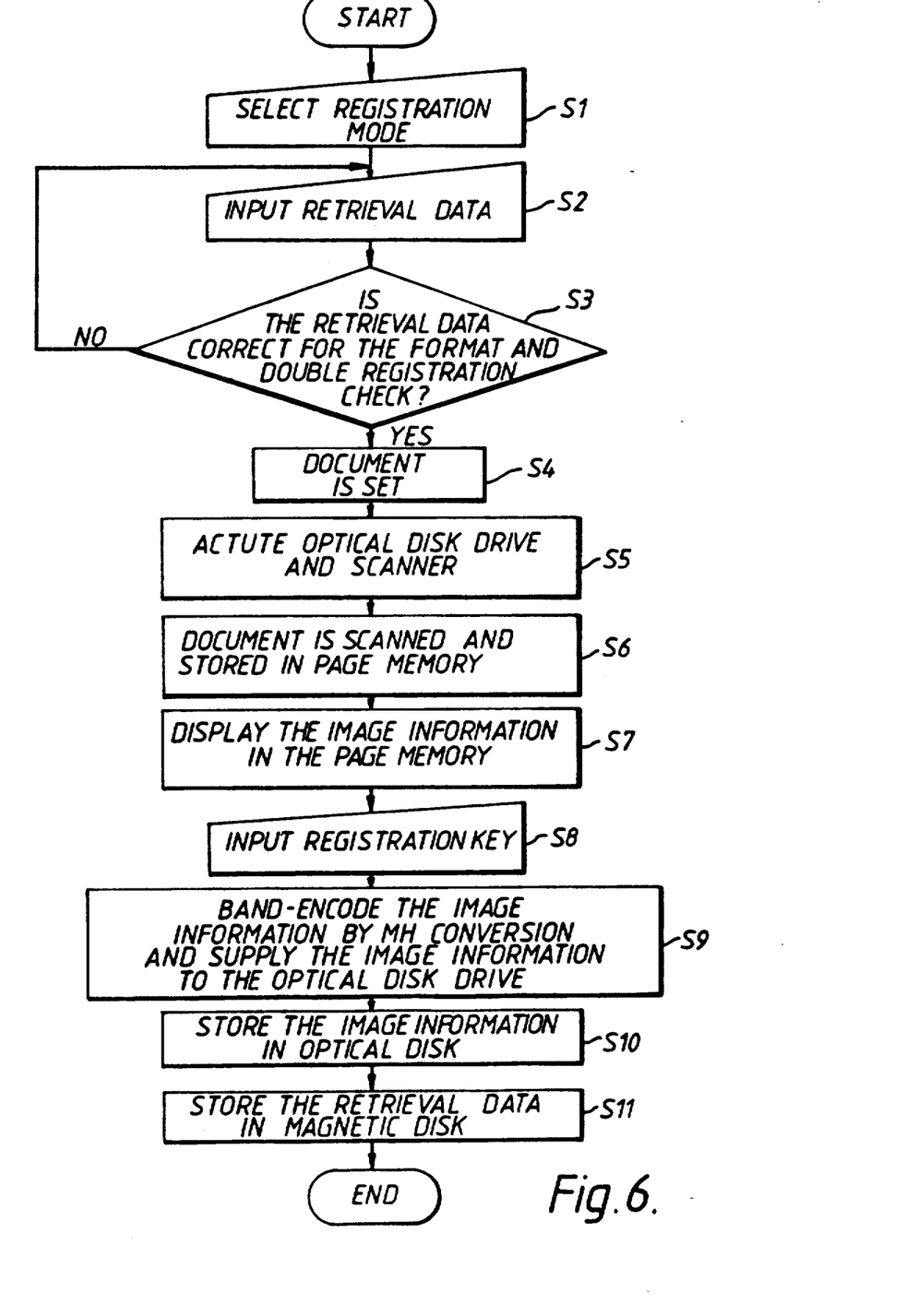
FIG. 6 is a flow chart useful for explaining the registration operation of the image information processing apparatus shown in FIG. 1.

The registration operation of the image information processing apparatus shown in FIG. 1 will now be described with reference to the flow chart shown in FIG. 6.

A registration mode is first set from keyboard 23 in step S1. This may be accomplished by inputting "1" when, for example, CRT display 24 displays a message of "registration mode: 1" and "retrieval mode: 2". When the registration mode is set, the retrieval data and the size of a document of the image information to be registered is input from keyboard 23 in step S2. Then, in step S3, CPU 34 performs the checking operation of the input data such as checking of the number of digits, the kind of characters, and so on, according to the format of the retrieval data which is prepared in advance. The retrieval data that are already registered are checked for double registration. If the retrieval data is one correct one, it is stored in main memory 38. If the retrieval data is not correct, the program returns to step S2, and another retrieval data is input. In step S4, the operator sets an original document to two-dimensional scanner 18. In step S5, CPU 34 makes optical disk drive 22 and scanner 18 start performing their functions.

In step S6, scanner 18 scans the original document and converts the image information printed on the original into electric signals. The image information, i.e., electric signals, is stored in page memory 40, line by line. When all one-page image information is stored in page memory 40, it is transferred to display memory 42 through image bus 12 in step S7.

In step S7, the one-page information is displayed by CRT display 24, Then, when this information is correct, the operator pushes a registration key (not shown) of keyboard 23 in step S8. CPU 34 outputs a control signal to page memory 40. In response to this control signal, page memory 40 transfers the one-page image information to CODEC 50, line by line. In step S9, CODEC 50 performs the MH conversion and supplies the compressed image information to optical disk drive 22 through buffer memory area 40a and interface circuit 36. Optical disk drive 22 stores the image information in optical disk 20 in step S10. Then, the retrieval data stored in main memory 38 is stored in magnetic disk 26 by magnetic disk drive 27 in step S11. Any other one-page image information is processed and stored in optical disk 20 in the same manner as described above.

Figure 7A:
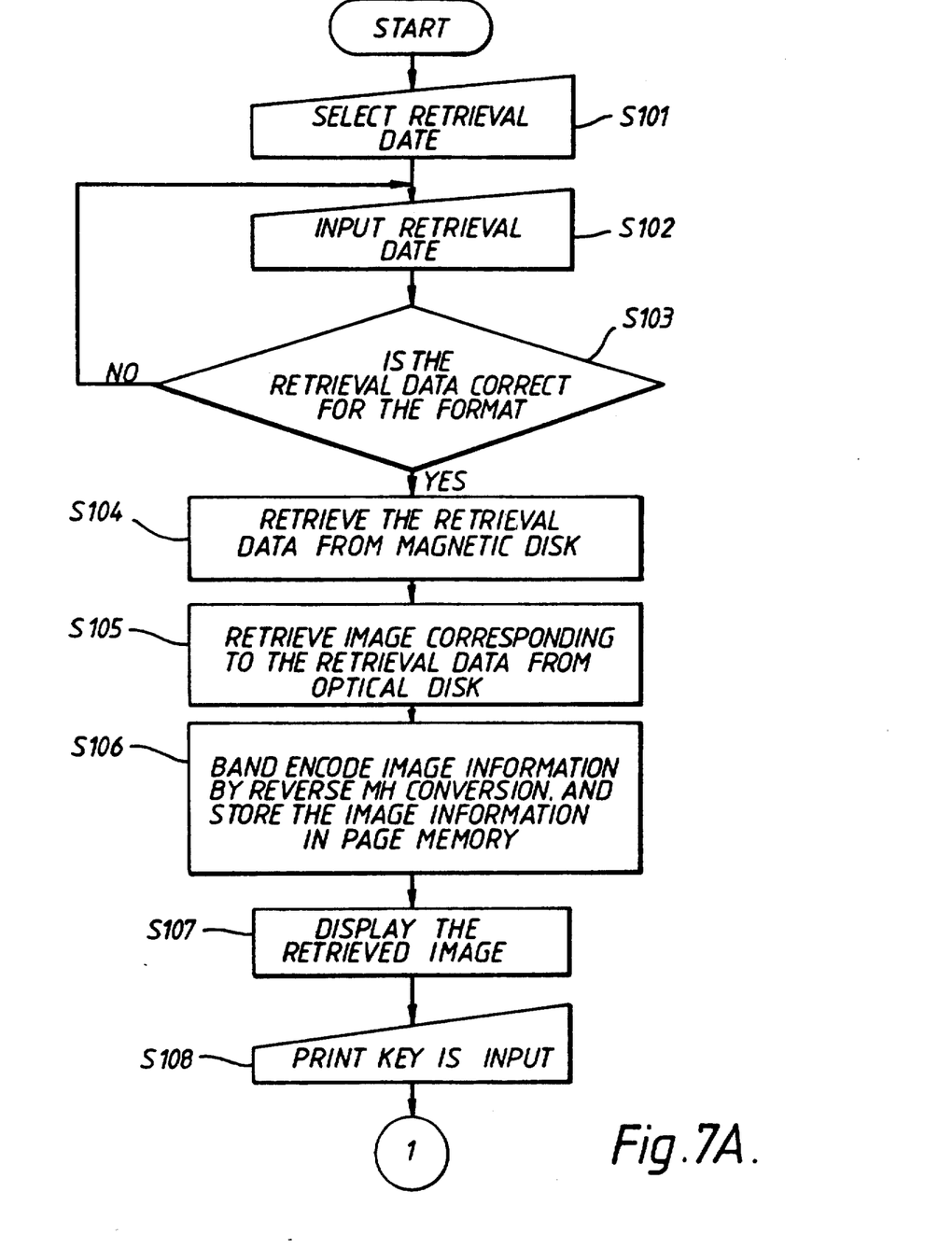
FIGS. 7A and 7B are flow charts useful for explaining the retrieving and printing operation of the image information processing apparatus shown in FIG. 1.
Figure 7B:
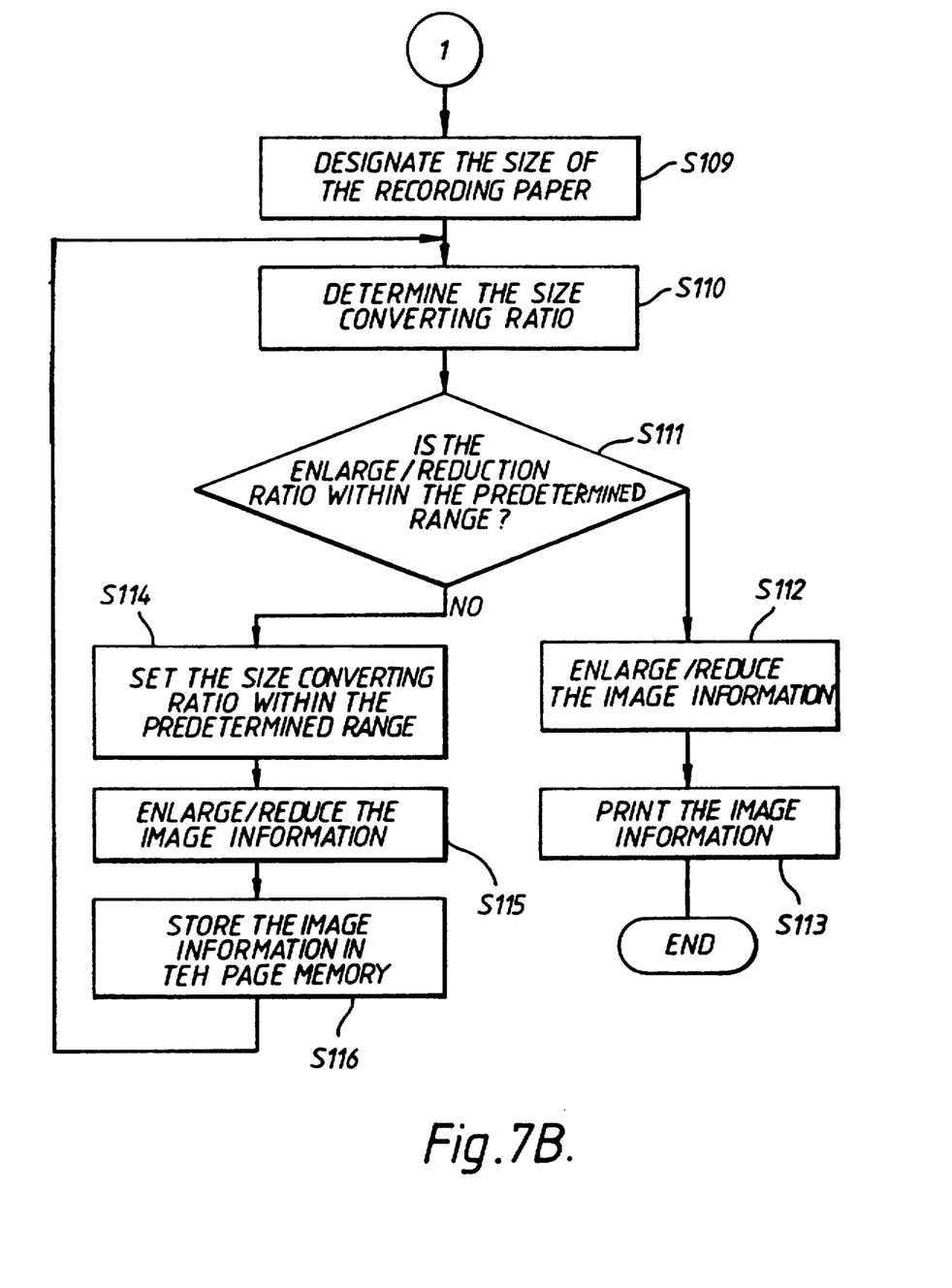

The retrieval operation of the image information processing apparatus shown in FIG. 1 will now be described with reference to the flow charts shown in FIGS. 7A and 7B.

The retrieval mode is set from keyboard 23 in step S101. In step S102 the retrieval data of the image information is input from keyboard 23. Then, in step S103, CPU 34 checks the input data to check, e.g., the number of digits, the kind of characters, as so on, according to the format of the retrieval data which is prepared in advance. If the retrieval data is not correct, the program returns to step S102, and another retrieval data is input. If the retrieval data is correct, CPU 34 compares the data with the retrieval data stored in magnetic disk 26 and it is ascertained whether or not an identical data is stored in magnetic disk 26. If the identical data is stored in magnetic disk 26, magnetic disk drive 27 retrieves the retrieval data from magnetic disk 26 and supplies it to main memory 38 through interface circuit 36 in step S104. In step S105, CPU 34 instructs optical disk drive 22 to retrieve the image information corresponding to the retrieval data from optical disk 20. In step 106, optical disk drive 22 supplies the encoded image information to CODEC 50 through interface circuit 36 and buffer memory area 40a of page memory 40, line by line. Also, CODEC 50 band-decodes this image information, thus restoring the image information, which is supplied to page memory 40, line by line. When one page of this image information is stored in page memory 40, it is supplied through display memory 42 and displayed by CRT display 24 through display controller 44 in step S107. The operator may confirm that the image information displayed on CRT display 24 is the desired image information. When a print operation key (not shown) of keyboard 23 is operated to obtain a hard copy after the confirmation of the image information in step S108, a copying operation of the image information processing apparatus of the present invention occurs. In step S109, the operator designates the size of the recording paper outputted from printer 25 by keyboard 23. Then CPU 34 confirms the size of the image information stored in page memory 40 by the document size S of the retrieval data and the size of the recording paper designated by the operator. At the same time, CPU 34 determines a size converting ratio (an enlarge/reduction ratio) R of the image information by enlarge/reduction circuit 46 in step S110.

TABLE 1 is useful in explaining the size converting ratio R corresponding to the size of the image information stored in optical disk 20 and the size of the recording paper outputted from printer 25.

TABLE 1

SIZED CONVERTING RATIO R IN ACCORDANCE WITH THE SIZE OF THE IMAGE

| THE SIZE OF THE IMAGE INFORMATION | THE SIZE OF THE RECORDING PAPER | SIZE CONVERTING RATIO R |
| --- | --- | --- |
| A2 size | A3 size | 71% |
| A2 size | A4 size | 50% |
| A3 size | B4 size | 86% |
| A3 size | A4 size | 71% |
| A3 size | A5 size | 50% |
| A4 size | A3 size | 141% |
| A4 size | B4 size | 122% |
| A4 size | B5 size | 86% |
| A4 size | A5 size | 71% |
| A5 size | A3 size | 200% |
| B5 size | A4 size | 115% |

In step S111, CPU 34 ascertains whether or not the size converting ratio R is within the predetermined range (60% ≦ R ≦ 150%). If the size converting ratio R is within the predetermined range, for example, the size of the image information is A3 size and the size of the recording paper is A4 size. The image information stored in page memory 40 is supplied to enlarge/reduction stored in page memory 40 is supplied to enlarge/reduction circuit 46, and then circuit 46 performs the enlarge/reduction operation by the size converting ratio in response to the control signal from CPU 34 in step S112. Then, the enlarged/reduced image information is supplied to printer 25 through printer interface 54. Printer 25 reproduces the image information on the recording paper of the designated size in step S113.

If the size converting ratio R is outside a predetermined range (i.e., R > 150% or R < 60%), for example, if the size of the image information is A2 size and the size of the recording paper is A4 size, the following steps are performed. First, CPU 34 sets up the size converting ratio R1 within the predetermined range (60% ≦ R1 ≦ 150%) in step S114. Then, the image information stored in page memory 40 is supplied to enlarge/reduction circuit 46, and enlarge/reduction circuit 46 performs the enlarge/reduction operation by the size converting ratio set by CPU 34 in step S116. Then, the enlarged/reduced image information by enlarge/reduction circuit 46 is supplied to page memory 40 in step S115. Then, CPU 34 determines the size converting ratio corresponding to the size of the image information stored in page memory 40 and and the size of the recording paper. Thus, the program of the printing operation returns to step S110, and the image information on the recording paper of the designated size is reproduced from printer 25 in the same manner as described above. For example, when the size of the image information retrieved from optical disk 20 is A2 size and the size of the recording paper is A4 size, the image information is reduced to the image information of A3size by enlarge/reduction circuit 46. Then, this image information of A3 size is restored in page memory 40. Further, this image information stored in page memory 40 is reduced to the image information of A4 size by enlarge/reduction circuit 46 and is supplied to printer 25.

This image information processing apparatus, therefore, may perform the printing operation with respect to the large-size image information retrieved from optical memory. In the image processing apparatus of the present invention, thus, the image information of any sizes recorded on optical memory may be printed by the printer without a timing error.

It should be understood that detailed description and examples, while indicating presently preferred embodiments of this invention, are given by way of illustration only. Various modifications and changes may be within the scope of the present invention.

What is claimed is:

1. An image information processing apparatus, comprising:
    first memory means for storing image information;
    means for retrieving the image information from the first memory means;
    second memory means for storing the image information retrieved by the retrieving means;
    means for reducing a size of the image information stored in the second memory means, in accordance with a size converting ratio, a size of the reduced image information being limited to within a predetermined range of the reducing means;
    means for outputting the image information reduced by the reducing means;
    means for determining a first size converting ratio corresponding to the size of the image information stored in the second memory means and a size of the image information outputted from the outputting means, the determining means including means for ascertaining whether or not the first size converting ratio is within the predetermined range of the reducing means and means for setting a second size converting ratio which is within the predetermined range of the reducing means, when the first size converting ratio is outside the predetermined range; and
    means for controlling the converting means, the controlling means including first means for supplying the size reduced image information to the outputting means when the reducing means reduces the size of the image information stored in the second memory means by the first converting ratio and second means for supplying the size reduced image information to the second memory means when the reducing means reduces the size of the image information stored in the second memory means by the second converting ratio, wherein the determining means determines the first converting ratio corresponding to the image information supplied by the second memory means and a size of the image information outputted by the outputting means.

2. The image information processing apparatus of claim 1, wherein the first memory means includes an optical memory.

3. The image information processing apparatus of claim 1, wherein the second memory means includes a buffer memory.

4. The image information processing apparatus of claim 1, wherein the outputting means includes printing means for printing the image information on a recording paper.

5. The image information processing apparatus of claim 1, wherein the outputting means includes displaying means for displaying image information stored in the second memory means.

6. The image information processing apparatus of claim 1, further comprising scanning means for inputting image information from an original document and third means for supplying the image information inputted by the scanning means to a page memory.

7. A method for retrieving image information stored in a first memory means and outputting image information, comprising the steps of:
    retrieving the image information from the first memory means;
    storing in a second memory means the image information retrieved in the retrieving step;
    reducing the image information to yield a reduced information, a size converting ratio used in the reducing step corresponding to a size of the image information, and a size of the reduced image information being limited within a predetermined range;
    outputting the image information reduced in the reducing step;
    determining a first size converting ratio corresponding to a size of the image information stored in the second memory means and a size of the image information outputted in the outputting step, the determining step including a first substep of ascertaining whether or not the first converting ratio is within the predetermined range in the reducing step and a second substep of setting a second size converting ratio, which is within the predetermined range in the reducing step, when the first size converting ratio is outside the predetermined range; and
    controlling the reducing step, the controlling step including a first substep of supplying the reduced information to the outputting step when the image information stored in the second memory means is reduced by the first size converting ratio in the reducing step and a second substep of supplying the reduced image information to the second memory means when the image information stored in the second memory means is reduced by the second converting ratio in the reducing step, wherein a first size converting ratio corresponding to the image information supplied in the supplying substep and a size of the image information outputted in the outputting step is determined in the determining step.

* * * * *